United States Patent [19]

Kulpa

[11] Patent Number: 5,041,029

[45] Date of Patent: Aug. 20, 1991

[54] AUTOMATIC TROLLING ARRANGEMENT

[76] Inventor: Daniel S. Kulpa, 5528 Countess Dr., Fort Wayne, Ind. 46815

[21] Appl. No.: 313,080

[22] Filed: Feb. 21, 1989

[51] Int. Cl.$^5$ ............................................. B63H 21/22
[52] U.S. Cl. ............................................. 440/1; 440/6; 114/144 E; 114/144 B; 367/96; 367/173
[58] Field of Search ........... 114/144 R, 144 E, 144 B, 114/151; 440/1, 2, 6, 113; 43/26.1; 318/588; 367/106, 108, 111, 173; 364/432

[56] References Cited

U.S. PATENT DOCUMENTS

| | | | |
|---|---|---|---|
| 3,587,770 | 6/1971 | Flower | 244/82 |
| 3,844,242 | 10/1974 | Sernatinger et al. | 114/144 B |
| 4,225,949 | 9/1980 | Price et al. | 367/96 |
| 4,339,811 | 7/1982 | Bednarz et al. | 43/26.1 |
| 4,737,940 | 4/1988 | Arringotn | 367/173 |

*Primary Examiner*—Jesus D. Sotelo
*Attorney, Agent, or Firm*—Roger M. Rickert

[57] ABSTRACT

Automated constant depth steering and automated yaw correcting techniques for fishing boats or similar craft usable in concert or separately are disclosed. The constant depth steering arrangement controls a relative constant thrust electric trolling motor by varying the orientation of this trolling motor which propels the boat relative to the boat. The constant depth steering arrangement includes operator entry switches and potentiometers for receiving an operator selected water depth and an indication of the direction and sense in which water depth changes. The automatic yaw correcting arrangement includes a rudder-like structure for sensing the lateral component of craft motion relative to the water, and is responsive to the sensed lateral motion to imparting a lateral thrust to the craft in opposition to the sensed lateral component of craft motion. The lateral thrust may be provided by a reversible motor such as another trolling motor mounted to the craft with its thrust axis transverse to the craft, and the sensing arrangement, in addition to the rudder may include a normally open switch coupled to the rudder and closable in one of two positions when the lateral component of craft motion exceeds a prescribed threshold, the one closed position being indicative of the direction of lateral motion and, therefore, the direction in which the reversible motor must be energized to appropriately compensate.

9 Claims, 4 Drawing Sheets

AUTOMATIC TROLLING ARRANGEMENT

SUMMARY OF THE INVENTION

The present invention relates generally to the control of small craft such as fishing boats and the like and more particularly to a control arrangement which powers the craft while maintaining the depth or vertical distance from the craft to the bottom of a body of water substantially constant.

In recreational fishing, for example, when trolling or moving along a shoreline and casting, it is often desired to move the fishing boat along a generally constant depth path. This heretofore required a portion of the fisherman's attention and time for guiding the boat or the presence of a second person to guide the boat. A system which propelled a boat along a constant depth path would be highly desirable in freeing a fisherman from the guidance task and would have additional advantages such as aiding navigation of a small boat at night when a shoreline is difficult or impossible to identify.

Among the several objects of the present invention may be noted the provision of a system for propelling a small boat along a constant depth path; the provision of an automated small craft navigating system requiring minimum operator intervention; the provision of a method and apparatus for automatic guidance of a small motor powered boat; the provision of a method and apparatus for the automatic yaw correction of a small craft; and the provision of an integrated yaw correction and automated guidance system for a fishing boat. These as well as other objects and advantageous features of the present invention will be in part apparent and in part pointed out hereinafter.

In general, a method of and apparatus for guiding a small motor powered boat includes sensing of the vertical distance between the boat and the bottom of a body of water in which the boat is floating followed by a comparison of the sensed distance to an operator selected distance. The direction of motor thrust relative to the boat is changed when the comparison indicates the sensed distance and the selected distance differ by more than a user determined value. The direction of motor thrust is changed in a direction determined at least in part by previous knowledge of the position of the boat relative to the bottom of the body of water such as user entered information on the direction and sense in which water depth changes, e.g., an indication of whether movement to the left or to the right will result in a decreasing depth. The direction of motor thrust is changed by an operator predetermined fixed angle and the direction of motor thrust is returned to a neutral position when the comparison indicates the sensed distance and the selected distance differ by less than the predetermined value.

Also in general and in one form of the invention, a rotation compensating arrangement for a small craft includes an arrangement for sensing the lateral component of craft motion relative to the water and responds to the sensed lateral component to impart a lateral thrust to the craft in opposition to the sensed lateral component of craft motion. The lateral thrust may be provided by a reversible electric motor mounted to the craft with its thrust axis transverse to the craft. Sensing may be accomplished by a rudder and a normally open switch coupled to the rudder which closes in one of two positions when the lateral component of craft motion exceeds a prescribed threshold, the one closed position being indicative of the direction of lateral motion.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
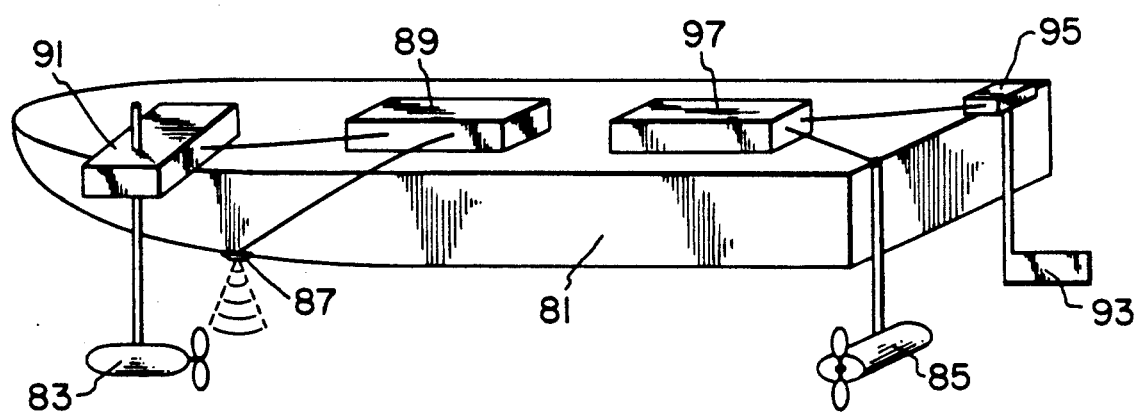
FIG. 1 is a pictorial representation of a small fishing boat or similar craft illustrating the invention in one form.

In FIG. 1, a small craft such as a fishing boat 81 has a bow mounted trolling motor 83 as well as a stern mounted trolling motor 85 and a bow mounted bottom sensing sonar transducer 87, all items per se well known to the sophisticated fisherman and commercially available. The bow mounted trolling motor 88 has an electric motor in module 91 for changing the direction of thrust of the motor while the stern mounted motor 85 is fixed in orientation to provide a thrust transverse and, preferably, perpendicular to the longitudinal axis of the boat 81. Water depth information is supplied from the sonar transducer 87 to electronics module 89 (FIGS. 2 and 4) which, in turn, controls the orientation of trolling motor 83. The electronics module 89 also receives information on the current orientation of trolling motor 83 from module 91. The stern mounted trolling motor 85 is reversible and is controlled by electronics module 97 (FIG. 5) which selectively enables the motor to provide leftward or rightward thrust. The electronics module 97 receives information on lateral drift or yaw from module 95 which is coupled to a rudder-like assembly 93 which senses boat motion relative to the water and provides an indication when the lateral component of such relative motion is excessive. In one preferred form, the module 95 contained a single-pole, double-throw switch which was closed in one of the two positions whenever the angle of relative water motion differed by more than five degrees from the longitudinal axis of the boat, and such switch closure enabled the motor 85 in a direction so as to compensate for the lateral motion of the stern of the boat. It will be noted that there is no electrical connection between modules 89 and 97 in FIG. 1 and while they may or may not share a common power supply, they are otherwise electrically independent.

Figure 2:
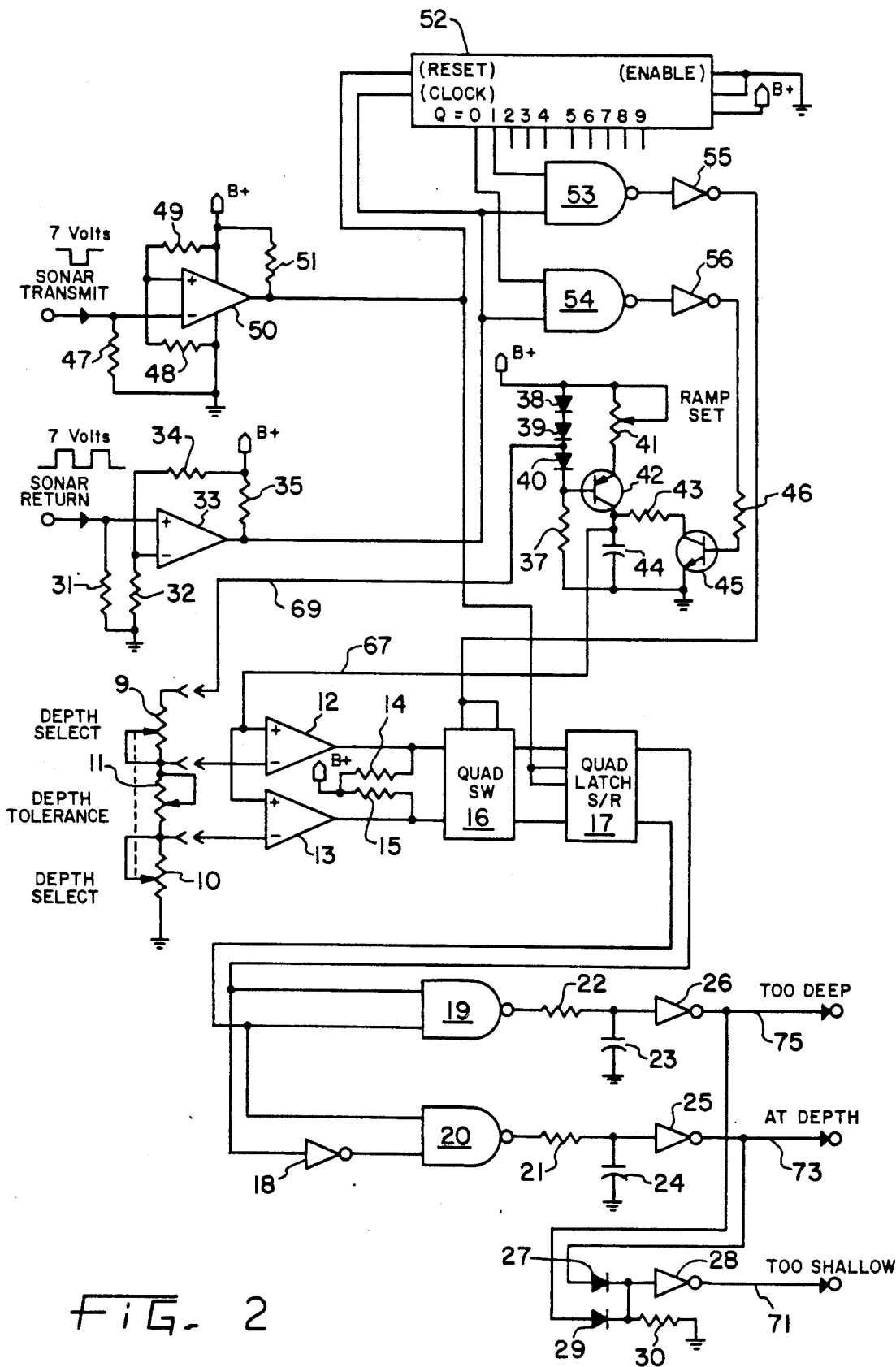
FIG. 2 is a schematic diagram illustrating sonar interface electronics suitable for the practice of the present invention.

Referring now to FIG. 2, the sonar transmit pulse level shifter is comprised of resistors 47, 48, 49 and 51, and comparator 50. Resistors 49 and 48 form a voltage divider which develops six volts at the positive input of comparator 50. The sonar transmit pulse is a normally seven volt level which drops to zero during the transmission of a sonar pulse. The output of comparator 50 is zero when its positive input is at a voltage level below the input on the negative input and at B+ whenever the input on the positive input exceeds that on the negative input, hence, the output of comparator 50 goes to B+ during the transmission of a sonar pulse.

The sonar bottom return pulse level shifter is comprised of resistors 31, 32, 34 and 35, and comparator 33. Resistors 32 and 34 form a voltage divider which develops one volt at the negative input of comparator 33. The sonar bottom return pulse is a normally zero volt level and goes to plus seven volts when the bottom reflection pulse is received. Thus, the output of comparator 33 goes to B+ upon receipt of bottom return pulses.

Comparator 50 provides a reset pulse for both the decade counter 52 and the R/S latch 17. When a single transducer is used for both transmit and receive, there is a level shifted sonar return pulse at the output of comparator 33 occurring simultaneously with the sonar transmit pulse. This pulse is applied to the "clock" input of decade counter 52 setting the counter to its zero state, and to one input of each of the NAND gates 53 and 54. With both inputs of NAND gate 54 high during the total transmit period, the output of inverter 56 is also high and supplies base current through resistor 46 to transistor 45 turning transistor 45 on. Thus, the output of inverter 55 is high during the first receive pulse only while the output of inverter 56 remains high and the ramp is held off for the total sonar transmit period. When transistor 45 conducts, capacitor 44 is discharged through resistor 43, thus shunting any current available from the collector of transistor 42 to ground. This sets the linear ramp voltage to zero at the start of each sonar transmission.

The linear voltage ramp generator comprises capacitor 44 and a constant current source including diodes 38, 39 and 40, potentiometer 41, resistor 37, and transistor 42. When a sonar transmit pulse is completed, capacitor 44 begins to charge. The diodes clamp the base of transistor 42 at three diode voltage drops below B+. The emitter of transistor 42 is clamped to B+ less the voltage drop across the three diodes 88, 39 and 40 plus the drop across the base-emitter diode of the transistor itself, thereby effectively clamping the emitter voltage at B+ less the voltage drop across two diodes. Thus, the collector-emitter current of transistor 42 is constant for a given setting of potentiometer 41. The constant current charging of capacitor 44 produces a linear voltage thereacross. The values of capacitor 44 and potentiometer 41 are selected so that the linear ramp voltage goes from zero to the maximum in the time it takes a sonar pulse to travel to the maximum selectable depth and return. In a preferred embodiment, the maximum depth was 35 feet corresponding to a transmit and return time of 0.014 seconds.

A sliding constant window comparator is built around variable resistors or potentiometers 9, 10 and 11, and comparators 12 and 13. Potentiometers 9 and 10 are of equivalent value, controlled by a common shaft, and connected so that when the resistance of one is increasing, the resistance of the other is decreasing. With resistor 11 set to zero, the negative inputs to the two comparators 12 and 13 can be varied from zero up to B+ less the drop in the two diodes 38 and 89 (the maximum ramp voltage). Also, with resistor 11 set to zero, the two negative inputs to comparators 12 and 13 are equal. By increasing the resistance of potentiometer 11, a difference which corresponds to the allowable depth tolerance, is established between the negative inputs to comparators 12 and 13. Once the value of resistor 11 is set, the current through the series combination of resistors 9, 11 and 10 is constant, as is the voltage drop across resistor 11, despite variations in the setting of resistors 9 and 10. The comparators function to compare the linear ramp voltage on line 67 with the fraction of the voltage on line 69 as set by potentiometers 9 and 10 which equates to the selected operating depth.

When both comparators 12 and 13 have outputs which are low, the sonar indicated depth is less than the potentiometer selected depth and when both are high, the indicated depth is greater than desired. With comparator 12 high and 13 low, the measured depth is within the limits set by the depth tolerance control 11. These comparator outputs are sampled at the time the bottom reflection pulse is received and then stored until the next bottom pulse is received. The sampling is accomplished by QUAD switch 16 which is turned on during the sonar bottom return pulse period. The outputs of sample switch 16 are connected to QUAD latch 17 which is reset (outputs low) during the sonar transmit pulse and a high thereafter from the sample switch 16 will set the corresponding QUAD latch output high where it will remain until reset upon the next sonar transmission pulse.

NAND gates 19 and 20, inverters 18, 25, 26 and 28, and diodes 27 and 29 perform the decoding logic which generates the "too shallow", "at depth" and "too deep" signals on lines 71, 73 and 75 respectively. These outputs drive the bow control electronics to be described subsequently. For example, when both comparators 12 and 13 have low outputs indicating that the depth sensed by the sonar is less than the selected depth, this "too shallow" condition raises the outputs of both NAND gates 19 and 20 high, thereby lowering the outputs of both inverters 25 and 26 and providing an output signal from inverter 28 on line 71. Similarly, an "at depth" condition corresponds to comparator 13 having a high output and comparator 12 having a low output. Under this condition, NAND gate 19 has a high output while the output from NAND gate 20 is low thereby providing a high signal only on line 73. As noted above, the QUAD latch 17 is reset by each sonar transmit pulse and to maintain the appropriate output signal on one of lines 71, 73 or 75 during this reset, memory circuits in the form of resistors 21 and 22 and capacitors 23 and 24 are provided with the voltage on the appropriate capacitor maintaining the appropriate "high" during the latch reset period.

Figure 3:
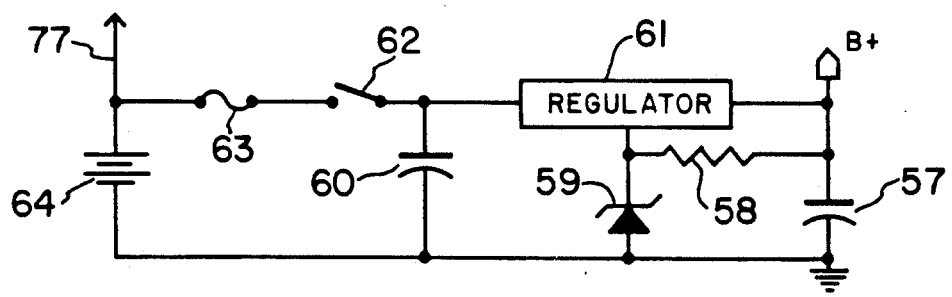
FIG. 3 is a schematic diagram showing a power supply circuit.

The power supply circuit of FIG. 3 is relatively conventional. Line 77 provides power directly from battery 64 to drive the trolling motors. Fuse 63 and switch 62 connect the battery 64 to a regulated B plus supply for the electronics which is enabled when switch 62 is closed. A 5.1 volt zener diode 59 in conjunction with a 5 volt integrated circuit regulator 61 sets the B plus level at the desired approximate 10 volt level with capacitors 57 and 60 smoothing any transients from switching or motor operation. There may be one power supply circuit for the circuitry of FIGS. 2 and 4, and a separate, but similar power supply circuit for the circuit of FIG. 5, or a single power supply circuit may be shared by the remaining circuitry as desired. In the first case, there would typically be separate storage batteries for the bow and stern trolling motors, while in the second, the trolling motors could share a common storage battery.

Figure 4:
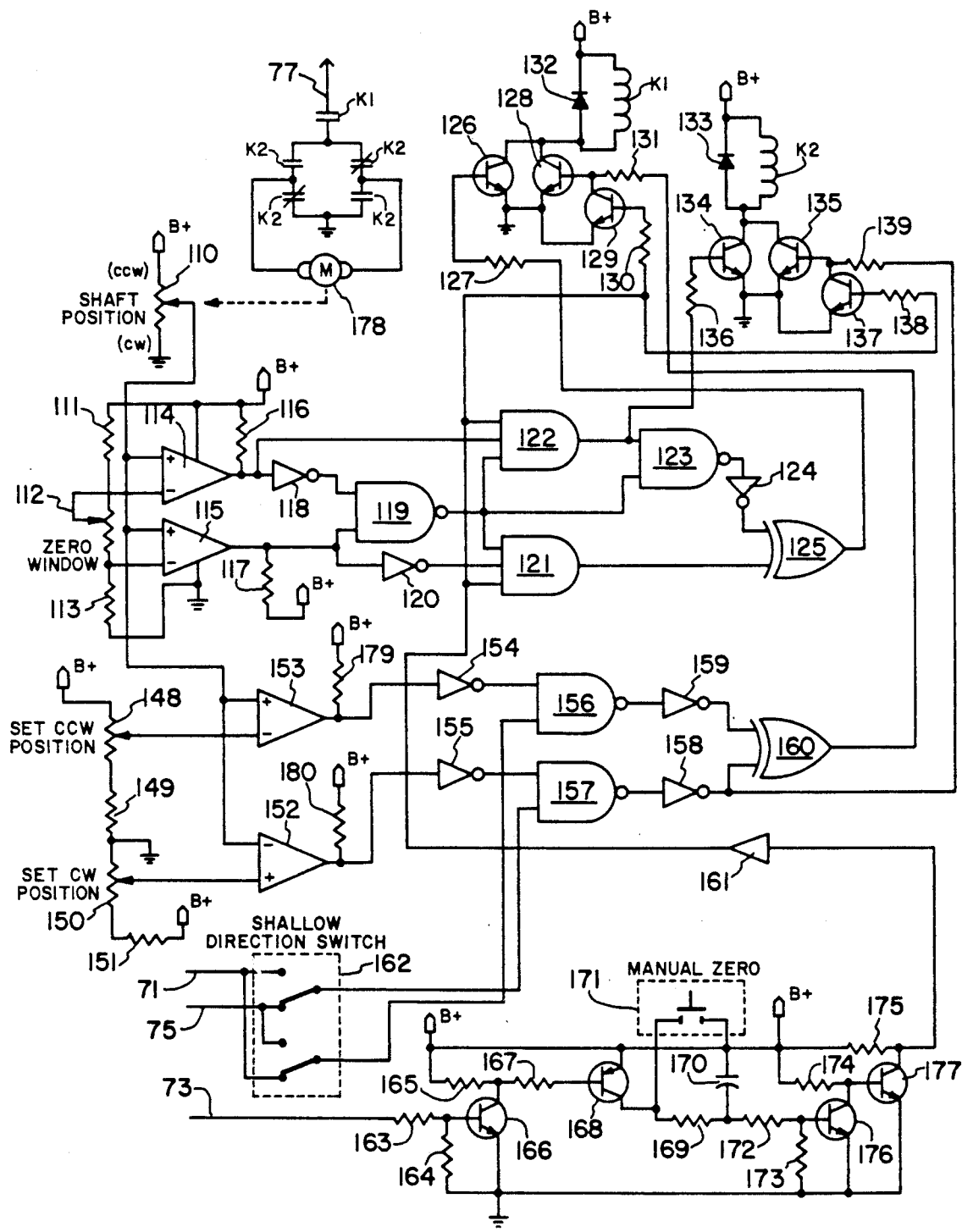
FIG. 4 is a schematic diagram of a circuit which is responsive to the circuit of FIG. 1 for controlling the rotation of a bow mounted trolling motor.

The bow trolling motor rotation control electronics as shown in FIG. 4 automatically controls the thrust direction of the bow mounted trolling motor. The inputs to this circuit include the too shallow 71, at depth 73 and too deep 75 signals from the correspondingly numbered lines in FIG. 2 as well as an indication of shaft position (and therefore, an indication of the direction of thrust of motor 83) from a potentiometer 110 located in module 91 of FIG. 1 and an operator entered indication, in the form of a selected one of the two possible positions of the double-pole, double throw-switch 162, of the direction in which the craft should be guided in order to reach more shallow water. This switch simply interchanges lines 71 and 75. The circuit utilizes this information to determine whether more starboard or more port thrust is required to correct for, for example, a too deep indication from the sonar signal processing unit of FIG. 2. When the B+ voltage is applied to the circuit, as by closing switch 62 of FIG. 3, capacitor 170 begins to charge through resistor 172 and the base-emitter diode of transistor 176. This charging current turns transistor 176 on grounding the base of transistor 177, maintaining that transistor nonconducting and the collector of that transistor at B+. This high level is passed by buffer 161 and enables the system to energize motor 178 driving the shaft of motor 83 to its zero position. Shortly, the capacitor 170 charges to nearly B+, transistor 176 turns off and transistor 177 turns on driving the output of buffer 161 low and turning the zero positioning electronics off. The time constant for charging capacitor 170 is selected so that the zero positioning lasts for about one second and during this time, the sonar commands are inhibited from producing any shaft rotation. A manual zero switch 171 is also provided and when depressed, it discharges capacitor 170 through resistor 169, and when released, the zero position cycle is repeated. This manual zero may be used to aid manual setting of the position of motor 83 so that its thrust is directly forward for the zero shaft position. Zero shaft position preferably corresponds to a midway location of the slider of potentiometer 110. The potentiometer is linear and functions as a simple voltage divider to provide a direct current voltage which is proportional to shaft angular position and a voltage half the B+ value corresponds to a directly forward motor thrust. This voltage provides an input to a window comparator circuit comprising comparators 114 and 115, equal value resistors 111 and 113, and potentiometer 112.

In the window comparator circuit, if variable resistor 112 is set to zero, the voltage at the negative inputs of comparators 114 and 115 would be equal each being one-half the B+ voltage. As resistance 112 is increased, the negative input of comparator 114 increases and the negative input of comparator 115 diminishes to less than half the B+ voltage. This voltage difference is the comparator window and determines the angular extent of the shaft zero position and accommodates rotational inertia of the motor shaft after it is commanded to stop rotating. In one preferred embodiment, the resistor 112 was set to define a zero window of plus or minus two degrees.

When the shaft of motor 83 is in the extreme clockwise position, the voltage dividing potentiometer 110 applies a very low voltage to the positive inputs of comparators 114 and 115 and both have low outputs while when the potentiometer 110 in the extreme counterclockwise position, B+ is applied to the positive inputs of these comparators and both have high outputs. As the potentiometer moves in the counterclockwise direction, the voltage applied to the two positive inputs increases and the threshold for comparator 115 is reached before the threshold of comparator 114 (because resistor 112 is no longer set to zero) and the output of comparator 115 goes high while the output of comparator 114 remains low indicating zero shaft position with potentiometer 110 in about its midway position. Upon further counterclockwise rotation of the shaft of motor 83, both comparator outputs become high. The outputs of these comparators are decoded and supply inputs to the power relay K1 and rotation direction relay K2 as follows:

| Angular shaft position (in degrees) | 0-178 | 178-182 | 182-360 |
|---|---|---|---|
| Comparator 115 | high | high | low |
| Comparator 114 | high | low | low |
| Inverter 118 | low | high | high |
| AND gate 119 | high | low | high |
| Inverter 120 | low | low | high |
| AND gate 122 | high | low | low |
| AND gate 121 | low | low | high |
| AND gate 123 | low | high | high |
| Inverter 124 | high | low | low |
| Exclusive OR 125 | high | low | high |
| Circuit Command to zero shaft position | rotate CW | no rotation | rotate CCW |

When the output of exclusive OR gate 125 is high, base current is supplied to transistor 126 by way of resistor 127, enabling transistor 126, energizing the coil of relay K1 and closing the normally open K1 contacts in series with battery lead line 77. When the coil of relay K2 is not energized, the normally closed contacts of relay K2 supply current to motor 178 causing rotation of the motor shaft in a counterclockwise direction. When the zero shaft position is reached, the output of exclusive OR gate 125 goes low, turning transistor 126 off deenergizing the relay K1 and disconnecting the motor 178 from power line 77. Actuation of the coil of relay K2 opens normally closed contacts and closes normally open K2 contacts thereby reversing the direction of current flow and, therefore, the direction of rotation of motor 178. Relay K2 is energized and motor rotation is in a clockwise direction when the output of AND gate 122 is high and transistor 134 is conducting, assuming, of course, that some corrective rotation to zero the shaft position is called for by exclusive OR gate 125 activating relay K1.

When an at depth signal is received on line 73 from the sonar interface circuitry of FIG. 2, base current flows through resistor 163 turning transistor 166 on and conduction by that transistor provides base current for transistor 168 by way of resistor 167 and transistor 168 also conducts discharging capacitor 170 through resistor 169 supplying base drive current to transistor 176 rendering it conductive. When transistor 176 conducts, base drive is removed from transistor 177 rendering it nonconducting and raising the output of buffer 161 to a high level to enable the zero position control circuitry.

The operator determines the maximum or extremes of angular movement of motor 83 by setting potentiometers 148 and 150. The selected positions of these potentiometers determines the negative input voltages on comparators 153 and 152 respectively at selected values between zero and one-half the B+ voltage. A clockwise comparator circuit includes comparator 152 and resistors 151 and 150 while a counterclockwise comparator circuit includes comparator 153 and resistors 149 and 148. Resistors 148, 149, 150 and 151 are of the same value and the maximum operator selectable rotation limits are zero degrees counterclockwise and 360 degrees clockwise, i.e., plus or minus 180 degrees from the forward or shaft zero position. Typically, these limits will be set to 135 and 225 degrees which would correspond to 45 degrees to port and starboard respectively where the forward and lateral thrust components would be equal. In strong current or crosswind conditions nonsymmetrical settings may be employed.

For example, assume that shallow water is to the right or starboard and that this has been entered by the operator positioning the switch 162 in the position shown. Assume further that a too deep signal is received on line 75 indicating that the craft has deviated too far to port. Under these conditions, the desired action Is for the motor shaft to rotate clockwise until the operator selected limit or stop setting determined by the position of potentiometer 150 is reached. The output of comparator 152 will be low so long as the shaft position voltage from potentiometer 110 on the negative input exceeds the maximum clockwise set position voltage from potentiometer 150. As the shaft rotates clockwise, the shaft position voltage decreases and when the selected maximum clockwise position is reached, the output of comparator 152 goes high. With the output of comparator 152 low, the inverter 155 has a high output. This inverter output and the high on line 75 indicative of the too deep condition form the inputs to NAND gate 157 the output of which is low under these conditions. Inverter 158 then supplies a high input to the exclusive OR circuit 160 providing base drive to transistor 128 enabling the coil of power relay K1 which, with K2 energized, causes clockwise rotation of shaft rotating motor 178. This can occur only if transistor 129 is off which is the case when the zero position circuit is not enabled. K2 is enabled because the high output of inverter 158 is supplied by way of resistor 139 to the base of transistor 135, turning that transistor on and enabling relay K2. The enabling of relay K2 can occur only if transistor 137 is off which is the case when the zero position circuit is not enabled. When the clockwise set position of the shaft is reached, comparator 152 goes high, inverter 155 goes low, NAND gate 157 goes high, inverter 158 goes low, exclusive OR gate 160 goes low and transistor 128 is turned off disconnecting the K1 power relay contacts. The low output from inverter 158 also turns transistor 135 off deenergizing the coil of relay K2.

A too shallow signal on line 71 indicating a need for counterclockwise rotation has a similar effect on comparator 153, inverter 154, NAND gate 156, and inverter 159, With two notable exceptions. The inputs to comparator 153 are reversed as compared to the clockwise rotation circuitry since continued counterclockwise rotation increases rather than decreasing the voltage from potentiometer 110. There is no connection from inverter 159 for enabling relay K2 since the desired direction of rotation is opposite and is in the direction set by the normally closed contacts of that relay.

Sailboats employ a keel to avoid excess lateral motion relative to the water. Motor powered boats generally merely steer into the wind or water current to compensate for drift. With the automated constant depth guidance system as described so far, it may happen that the angular thrust of the bow mounted trolling motor 83 imparts too much yaw to the boat causing the boat to turn rather than steer to the selected depth. It may also be difficult to maintain the boat generally parallel to the shoreline for casting. A unique yaw compensating arrangement avoids these problems.

The arrangement for sensing lateral stern motion in the water is shown as a simple rudder 93 which is located sufficiently below the bottom of the boat so as to be unaffected by water flow about the hull. A two-pole, single-throw switch is connected to this rudder and closes in either of two positions to ground one of two circuits when lateral motion exceeds a prescribed value, but the switch is open or in an ungrounded position whenever the yaw is within acceptable limits. The simple mechanical switch contacts located in module 95 and shown in FIG. 5 could be replaced by sealed magnetic reed switches. Moreover, the rudder could be fixed in position and piezoelectric sensors or strain gauge outputs could be employed to sense yaw. With such sensor arrangements having outputs proportional to the yaw, variable speed stern correcting system employing continuous feedback would be possible.

Figure 5:
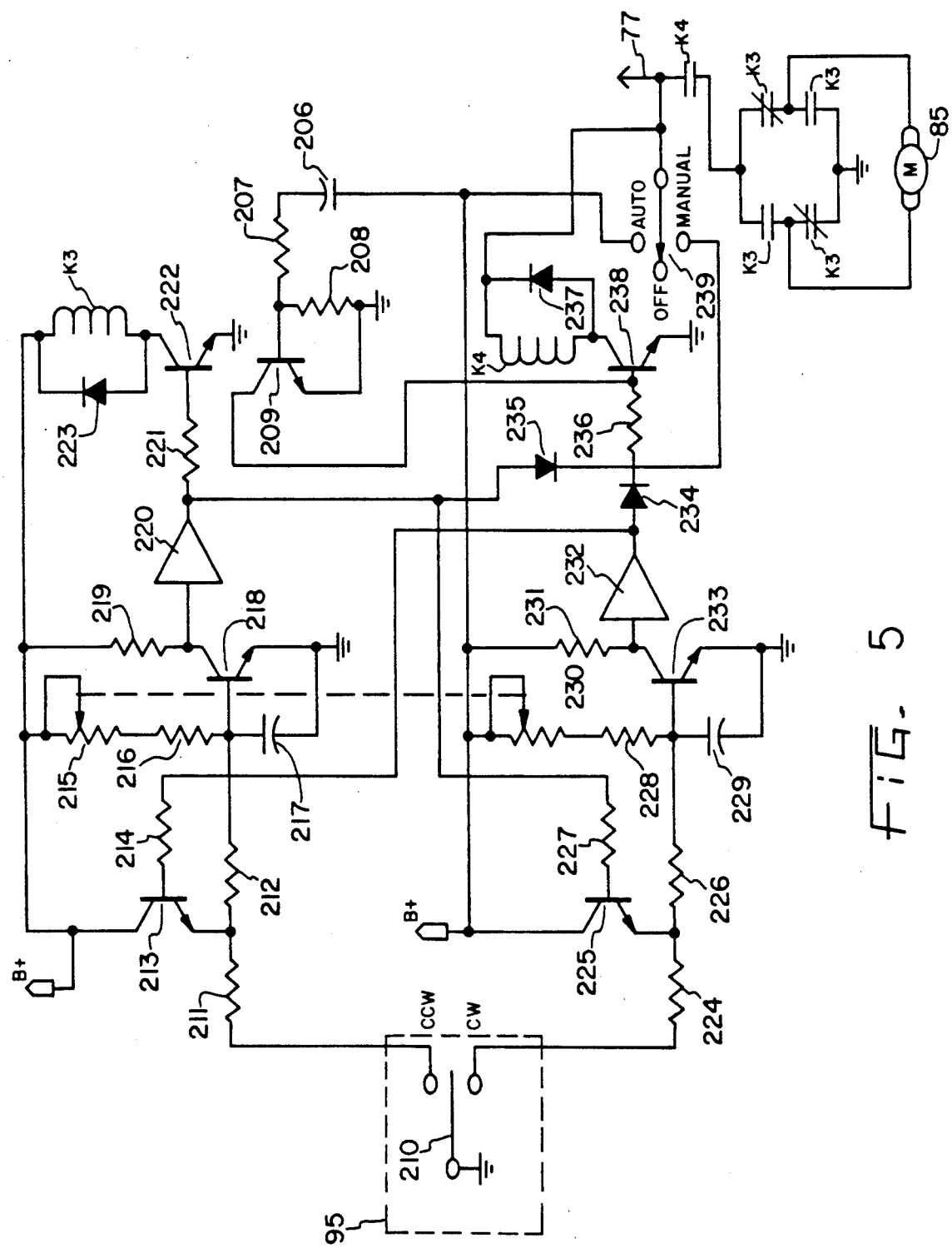
FIG. 5 is a schematic illustration of circuitry responsive to sensed relative water motion for controlling a stern mounted trolling motor.

The circuitry in module 97 for controlling the lateral thrust motion 85 is shown in FIG. 5. So long as the direction of motion of the stern of the craft is within a selected range, e.g., plus or minus five degrees, of the longitudinal axis of the craft, no corrective action is taken by this circuitry and the motor 85 inactive. When this angle is exceeded, the motor is enabled in the appropriate rotational sense to restore the motion relative to the water to within the selected range. Stern motion is sensed by a single-pole, double throw switch within module 95 which switch is mechanically coupled to rudder 93. The rudder 93 senses stern motion relative to the water and closes the switch in one of two senses when that motion becomes excessive. If the craft is tending to yaw to the left or turn to port, switch blade 210 is moved toward the contact labeled CW. When the contact is closed indicating the yaw is excessive, the counterclockwise inputs to be discussed subsequently are inhibited, a clockwise over-correction timer is activated, and the motor 85 is driven in a sense to rotate the craft clockwise. The timer maintains the motor corrective action for a period of time, for example, one to four seconds, after the switch blade 210 opens and no longer calls for clockwise rotation to compensate for the plus or minus five degree range where the switch is open and any other insensitivities of the flow sensor. A similar sequence of events occur when the switch calls for a counterclockwise correction.

In FIG. 5, when switch 239 is moved from the off to the manual position, battery line 77 is connected to resistor 236 and base current flows enabling transistor 238 which in turn enables the coil of relay K4 and powers the motor 85. In this mode, the operator manually guides the motor in the conventional way. In the automatic mode, however, the motor will be fixed to provide thrust in a direction transverse to the longitudinal axis of the boat. When switch 239 is first moved to the automatic position, resistors 207 and 208, transistor 209 and capacitor 206 function as an inhibit circuit allowing the circuitry to reach a steady state condition during an initial stabilization period. Upon closure of the switch, capacitor 206 begins to charge and that current flow enables transistor 209 which in turn grounds the base of transistor 238 insuring that transistor is nonconducting.

The circuit values are selected so that an initialization period of about five seconds occurs before transistor 209 returns to a nonconducting state. Power is also applied to the B+ terminals when the switch 239 is closed and capacitors 217 and 229 are charged to about 0.7 volts through their respective resistors 215 and 216, and 230 and 228. Resistors 215 and 230, capacitors 217 and 229, and resistors 216 and 228 are preferably equivalent valued and the charge voltage of the capacitors is clamped by the base-emitter diodes of the transistors 218 and 233. After the initial stabilization period, the circuit is ready to perform its normal yaw correcting function.

When clockwise correction is called for by switch contact 210 closing on the CW terminal, capacitor 229 discharges through resistors 224 and 226. This grounds the base of transistor 233 and both its base and collector currents go to zero. With no collector current in transistor 233, there is no voltage drop across resistor 231 and the input to buffer 232 goes to B+. Buffer 232 provides a low impedance output of the collector voltage of transistor 233. With the output of buffer 232 high, base current flows through diode 284 and resistor 236 turning transistor 238 on energizing the coil of relay K4. When relay K4 is energized, current flows through the normally closed contacts of relay K3 driving motor 85 to correct the sensed lateral motion of the stern of the craft.

The high output from buffer 232 also provides base current through resistor 214 turning transistor 213 on raising the voltage level at the junction between resistors 211 and 212 to B+ and insuring that no grounding of the CCW terminal or discharge of capacitor 217 initiates an attempted counterclockwise correction during the called for clockwise correction.

As clockwise correction continues, the flow sensor or rudder will eventually sense stern motion within five degrees of the craft axis and switch blade 210 will open ungrounding resistor 224 and capacitor 229 will begin to recharge through resistors 228 and 230. When the voltage across capacitor 229 reaches the approximately 0.7 volt base-emitter drop of transistor 233, the transistor turns on grounding the input of buffer 232. The output of buffer 232 also goes low turning transistor 238 off and opening the contacts of relay K4. The time required to recharge capacitor 229 is the over-correction period discussed earlier and may be adjusted by setting the variable resistor 230 to correspond to a charging time of between one and four seconds. Variable resistor 230 and the corresponding variable resistor in the counterclockwise correction portion of the circuit may be ganged together for a common time delay setting as indicated by the dotted line joining them if desired.

Upon closure and grounding of the CCW contacts, the operation of the counterclockwise correction circuitry is essentially as described above up to the output of buffer 220 which corresponds to buffer 232 of the clockwise correction circuit. When the output of either of these buffers is high, correction is called for and transistor 238 is turned on by way of either diode 234 or diode 235, relay K4 is energized, and power is supplied to motor 85. Buffer 220, however, provides an additional output which by way of resistor 221 turns transistor 222 on enabling relay K3. The normally open contacts of this relay close and the normally closed contacts open reversing the leads to and, therefore, the direction of rotation of motor 85. Counterclockwise correction is otherwise much the same as clockwise correction.

From the forgoing, it is now apparent that a novel control arrangement for a small craft such as a fishing boat has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A guidance system for a small boat comprising a bow mounted automatic constant depth steering arrangement, a stern mounted automatic yaw correcting arrangement, and means for propelling the boat forward in water, the constant depth steering arrangement including means for controlling the means for propelling the boat, arrangements being electrically independent.

2. The guidance system of claim 1 wherein the means for propelling the boat provides a relative constant thrust and the means for controlling varies the orientation of the means for propelling the boat relative to the boat.

3. The guidance system of claim 2 wherein the constant depth steering arrangement includes operator entry means for receiving an operator selected water depth and an indication of the direction and sense in which water depth changes.

4. A rotation compensating arrangement for a small craft comprising means for sensing the lateral component of craft motion relative to the water, the means for sensing comprising a rudder and a normally open switch coupled to the rudder and closable in one of two positions when the lateral component of craft motion exceeds a prescribed threshold, the one closed position being indicative of the direction of lateral motion, and means responsive to the means for sensing for imparting a lateral thrust to the craft in opposition to the sensed lateral component of craft motion.

5. The rotation compensating arrangement of claim 4 wherein the means for imparting a lateral thrust includes a reversible motor mounted to the craft with its thrust axis transverse to the craft.

6. A small motor powered boat guidance system comprising:
   means for sensing the vertical distance between the boat and the bottom of a body of water in which the boat is floating;
   means for comparing the sensed distance to an operator entered selected distance and for providing an output indication when the sensed distance and the selected distance differ by more than a predetermined value;
   means for changing the direction of motor thrust relative to the boat when the means for comparing indicates the sensed distance and the selected distance differ by more than the predetermined value; and
   operator entry means for receiving operator selected and entered indications of: water depth, the predetermined value for the difference between the sensed and selected distances, an indication of the direction and sense in which water depth changes, and the angular extent of the change in direction of motor thrust.

7. A guidance system for a small boat comprising a bow mounted automatic constant depth steering arrangement, a stern mounted automatic yaw correcting arrangement, and means for propelling the boat forward in water, arrangements being electrically independent, the automatic yaw correcting arrangement including means for sensing the lateral component of boat motion relative to the water, and means responsive to the means for sensing for imparting a lateral thrust to the boat in opposition to the sensed lateral component of boat motion.

8. The guidance system of claim 7 wherein the means for imparting a lateral thrust includes a reversible motor mounted to the boat with its thrust axis transverse to the boat, and the means for sensing comprises a rudder and a normally open switch coupled to the rudder and closable in one of two positions when the lateral component of boat motion exceeds a prescribed threshold, the one closed position being indicative of the direction of lateral motion.

9. A rotation sensing and compensating arrangement for a small boat comprising rudder means for sensing the lateral component of boat motion relative to the water, and means spaced from and responsive to the means for sensing for imparting a lateral thrust to the boat in opposition to the sensed lateral component of boat motion.

* * * * *